US007174769B2

(12) United States Patent
McSheffrey, Jr. et al.

(10) Patent No.: US 7,174,769 B2
(45) Date of Patent: Feb. 13, 2007

(54) MONITORING CONTENTS OF FLUID CONTAINERS

(75) Inventors: John McSheffrey, Jr., Needham, MA (US); Brendan T. McSheffrey, Newton, MA (US)

(73) Assignee: MIJA Industries, Inc., Rockland, MA (US)

( * ) Notice: Subject to any disclaimer, the term of this patent is extended or adjusted under 35 U.S.C. 154(b) by 110 days.

(21) Appl. No.: 10/782,288

(22) Filed: Feb. 19, 2004

(65) Prior Publication Data

US 2004/0194980 A1 Oct. 7, 2004

Related U.S. Application Data

(63) Continuation-in-part of application No. 10/274,606, filed on Oct. 21, 2002, which is a continuation-in-part of application No. 09/832,531, filed on Apr. 11, 2001, now Pat. No. 6,585,055, which is a continuation-in-part of application No. 09/212,121, filed on Dec. 15, 1998, now Pat. No. 6,302,218, which is a continuation of application No. 08/879,445, filed on Jun. 20, 1997, now Pat. No. 5,845,651, which is a continuation-in-part of application No. 08/590,411, filed on Jan. 23, 1996, now Pat. No. 5,775,430, which is a continuation-in-part of application No. PCT/US97/01025, filed on Jan. 23, 1997, now abandoned.

(60) Provisional application No. 60/449,234, filed on Feb. 20, 2003, now abandoned.

(51) Int. Cl.
*G01M 3/02* (2006.01)

(52) U.S. Cl. .............................................. 73/37; 169/75

(58) Field of Classification Search .................... 73/37; 169/75

See application file for complete search history.

(56) References Cited

U.S. PATENT DOCUMENTS 922,456 A 5/1909 Casey
2,670,194 A 2/1954 Hansson (Continued)

FOREIGN PATENT DOCUMENTS

DE 3 731 793 3/1989

(Continued)

OTHER PUBLICATIONS

NFPA 10 Standard for Portable Fire Extinguishers, 1998 Edition; Nat'l Fire Protection Assoc., pp. 10.

(Continued)

*Primary Examiner*—Hezron Williams
*Assistant Examiner*—Samir M. Shah
(74) *Attorney, Agent, or Firm*—Fish & Richardson P.C.

(57) ABSTRACT

Apparatus for remote inspection of fluid containers, e.g., portable tanks or fluid pipelines, includes an electronic circuit in communication between each container (or at various locations along a pipeline) and a remote central station. The electronic circuit is adapted to issue a wireless signal to the remote central station upon detection of predetermined internal conditions, such as an out-of-range pressure condition of fluid contained within the volume of the container, or upon detection of predetermined external conditions, such as the lack of presence of the container in its installed position or the presence of an obstruction to viewing of or access to the container.

12 Claims, 6 Drawing Sheets

U.S. PATENT DOCUMENTS 3,145,375 A 8/1964 Webb
3,333,641 A 8/1967 Hansom
3,664,430 A 5/1972 Sitabklhan
3,735,376 A 5/1973 Kermer
3,946,175 A 3/1976 Sitabkhan
4,003,048 A 1/1977 Weise
4,015,250 A 3/1977 Fudge
4,034,697 A 7/1977 Russell
4,051,467 A 9/1977 Galvin
4,100,537 A 7/1978 Carlson
4,101,887 A 7/1978 Osborne
4,125,084 A 11/1978 Salmonsen et al.
4,143,545 A 3/1979 Sitabkhan
4,184,377 A 1/1980 Hubbard
4,246,046 A * 1/1981 Lameyer .................... 148/592
4,279,155 A 7/1981 Balkanli
4,289,207 A 9/1981 Wernert
4,303,395 A 12/1981 Bower
4,342,988 A 8/1982 Thompson et al.
4,360,802 A 11/1982 Pinto
4,418,336 A 11/1983 Taylor
4,419,658 A 12/1983 Jarosz
4,531,114 A 7/1985 Topol
4,548,274 A 10/1985 Simpson
4,586,383 A 5/1986 Blomquist
4,599,902 A 7/1986 Gray
4,613,851 A 9/1986 Hines
4,697,643 A 10/1987 Sassier
4,805,448 A 2/1989 Armell
4,823,116 A 4/1989 Kitchen, III et al.
4,823,788 A * 4/1989 Smith et al. ........... 128/205.24
4,835,522 A 5/1989 Andrejasich et al.
4,866,423 A 9/1989 Anderson
4,887,291 A 12/1989 Stillwell
4,890,677 A 1/1990 Scofield
4,928,255 A 5/1990 Brennecke et al.
4,979,572 A 12/1990 Mikulec
5,123,409 A * 6/1992 Sheffield et al. ....... 128/204.18
5,153,567 A 10/1992 Chimento
5,224,051 A 6/1993 Johnson
5,357,242 A 10/1994 Morgano
5,460,228 A 10/1995 Butler
5,475,614 A 12/1995 Tofte et al.
5,486,811 A 1/1996 Wehrle
5,534,851 A 7/1996 Russek
5,578,993 A 11/1996 Sitabkhan et al.
5,596,501 A 1/1997 Comer et al.
5,613,778 A 3/1997 Lawson
5,652,393 A 7/1997 Lawson
5,706,273 A 1/1998 Guerreri
5,775,430 A 7/1998 McSheffrey et al.
5,781,108 A 7/1998 Jacob
5,793,280 A 8/1998 Hincher
5,848,651 A * 12/1998 McSheffrey et al. .......... 169/51
5,853,244 A 12/1998 Hoff et al.
5,864,287 A 1/1999 Evans
5,877,426 A 3/1999 Hay
5,936,531 A 8/1999 Powers
5,952,919 A 9/1999 Merrill
6,014,307 A 1/2000 Crimmins
6,114,823 A 9/2000 Doner
6,125,940 A 10/2000 Oram
6,155,160 A 12/2000 Hochbrueckner
6,311,779 B2 12/2000 McSheffrey et al.
6,168,563 B1 1/2001 Brown
6,240,365 B1 5/2001 Bunn
6,270,455 B1 8/2001 Brown
6,289,331 B1 9/2001 Pedersen et al.
6,302,218 B1 10/2001 McSheffrey et al.
6,317,042 B1 11/2001 Engelhorn et al.
6,488,099 B2 11/2001 McSheffrey et al.
6,336,362 B1 1/2002 Duenas
6,351,689 B1 2/2002 Carr et al.
6,357,292 B1 3/2002 Schultz et al.
6,401,713 B1 6/2002 Hill et al.
6,450,254 B1 9/2002 Hoyle et al.
6,496,110 B2 12/2002 Peterson et al.
6,542,076 B1 4/2003 Joao
6,585,055 B2 7/2003 McSheffrey et al.
6,587,049 B1 7/2003 Thacker
6,598,454 B2 7/2003 Brazier et al.
6,646,545 B2 11/2003 Bligh
6,856,251 B1 * 2/2005 Tietsworth et al. ......... 340/626
2003/0071736 A1 * 4/2003 Brazier et al. .............. 340/614
2003/0116329 A1 6/2003 McSheffrey
2003/0135324 A1 7/2003 Navab
2003/0189492 A1 * 10/2003 Harvie .................... 340/573.1

FOREIGN PATENT DOCUMENTS

FR 2 340 109 9/1977
FR 2 515 845 5/1983
FR 2 676 931 12/1992
WO WO 81/02484 9/1981
WO WO 94/11853 5/1994
WO WO 01/46780 6/2001
WO WO 01/93220 12/2001
WO WO 03/076795 9/2003
WO WO 03/098908 11/2003

OTHER PUBLICATIONS

Cole-Parmer Brochure, “Exciting New Products for Measuring Flow and Pressure,” Canada, received Apr. 23, 1996, 1 page.
Press Release, “Help That comes Too Late Is As Good As No Help At All—The Fire Extinguisher Alarm System Gives Immediate Help”, Undated, Invention Technologies, Inc.

* cited by examiner

MONITORING CONTENTS OF FLUID CONTAINERS

TECHNICAL FIELD

This application is a continuation-in-part of U.S. application Ser. No. 10/274,606, filed Oct. 21, 2002, which is a continuation-in-part of U.S. application Ser. No. 09/832,531, filed Apr. 11, 2001, now U.S. Pat. No. 6,585,055, issued Jul. 1, 2003, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned.

This application also claims benefit from U.S. Provisional Patent Application No. 60/449,234, filed Feb. 20, 2003, now abandoned.

This disclosure relates to monitoring contents of fluid containers such as portable tanks and pipelines, and, more particularly, to monitoring volume, fluid level, and/or other information associated with contents of fluid containers stored under pressure for e.g., healthcare, industrial, or commercial purposes.

BACKGROUND

Fluid containers such as portable oxygen tanks are often used in hospitals, nursing homes, and other healthcare facilities for use in medical procedures and patient recovery. Gauges are typically attached to the oxygen tanks to permit healthcare personnel to monitor tank contents including for malfunctions and contents depletion. Portable tanks are also used in industrial and commercial facilities, e.g., for storage of volatile and non-volatile fluids such as propane gas, nitrogen gas, hydraulic fluid, etc. under pressure for use in industrial manufacturing, processing, and fabrication. Similarly, portable tanks are used in commercial and domestic locations, including for cooking and other food preparation procedures using pressured gases that are also monitored by gauges.

Typically, gauges mounted to portable tanks, or similar fluid supply systems, provide an indication of the portable tank contents. For example, internal pressure of a portable tank may be measured by a gauge in communication with the portable tank volume. By measurement and display of internal pressure, it can be determined when internal pressure falls below a predetermined level necessary for proper use of the tank. Additionally, by providing an indication of internal pressure (e.g., pounds per square inch) of the portable tank or system, the measured pressure can be checked routinely to avert potential emergencies such as a pressure increase exceeding a safe containment rating of the associated portable tank.

By measuring and displaying internal pressure, gauges facilitate inspection of portable tanks, such as portable fire extinguisher tanks. Typically, such inspections are performed manually, and inspection of fire extinguishers located throughout a facility, e.g., such as a manufacturing plant or an office complex, or throughout an institution, e.g., such as a school campus or a hospital, may occupy one or more employees on a full time basis. Procedures for more frequent inspections are generally considered cost prohibitive, even where it is recognized that a problem of numbers of missing or non-functioning fire extinguishers may not be addressed for days or even weeks at a time, even where manpower may otherwise be available.

SUMMARY

In one aspect, he invention features an apparatus for remote inspection of containers containing pressurized fluid. A detector, such as a pressure gauge, is in communication with the fluid for measure of an internal condition, e.g., pressure, of the container. Electronic circuitry is in communication between the detector and a remote central station and issues a signal containing information about the internal condition to the central station.

In one implementation, an apparatus for remote inspection of portable oxygen tanks e.g., distributed throughout a hospital, nursing home, or other healthcare facility. A gauge mounted to each oxygen tank detects and displays a measure of the oxygen pressure contained within the volume of the oxygen tank. The oxygen tank gauge includes electronic circuitry that is in communication between the oxygen tank and a remote central station via a docking station that also contains electronic circuitry. The docking station electronic circuitry issues a hardwire or wireless signal to the central station upon detection of an condition associated with the oxygen tanks such as an out-of-range pressure condition, lack of presence of an oxygen tank in its installed position, or presence of an obstruction to access to the oxygen tank.

In another implementation, an apparatus for remote inspection of portable industrial gas tanks e.g., distributed throughout a storage site, factory, or other industrial facility. A gauge mounted to each industrial gas tank detects and displays a measure of the industrial gas contained within the volume of the industrial gas tank. The gauge includes electronic circuitry that is in communication between the industrial gas tank and a remote central station via a docking station that also contains electronic circuitry. The docking station electronic circuitry issues a hardwire or wireless signal to the central station upon detection of an condition associated with the industrial gas tanks such as an out-of-range pressure condition, lack of presence of an industrial gas tank in its installed position, or presence of an obstruction to access to the industrial gas tank.

In another implementation, an apparatus for remote inspection of portable commercial gas tanks e.g., portable propane gas tanks used with cooking equipment distributed e.g., throughout a private, public, or other commercial facility. A gauge mounted to each commercial gas tank detects and displays a measure of the gas contained within the volume of the commercial gas tank. The commercial gas tank gauge includes electronic circuitry that is in communication between the commercial gas tank and a remote central station via a docking station that also contains electronic circuitry. The docking station electronic circuitry issues a hardwire or wireless signal to the central station upon detection of an condition associated with the commercial gas tanks such as an out-of-range pressure condition, lack of presence of an commercial gas tank in its installed position, or presence of an obstruction to access to the commercial gas tank.

In another aspect, the invention features an apparatus for remote inspection of pipeline fluid, e.g., hydraulic fluid, air, water, oxygen, fuel oil etc. that flows through a pipeline that extends throughout a manufacturing plant or other commercial or private facility. A detector, such as a pressure gauge or flow meter, is in communication with the pipeline fluid for measure of an internal condition, e.g., pressure, flow rate, etc., of the pipeline. Electronic circuitry is in communication between the detector and a remote central station and issues a signal containing information about the internal condition to the central station.

DETAILED DESCRIPTION

Figure 1:
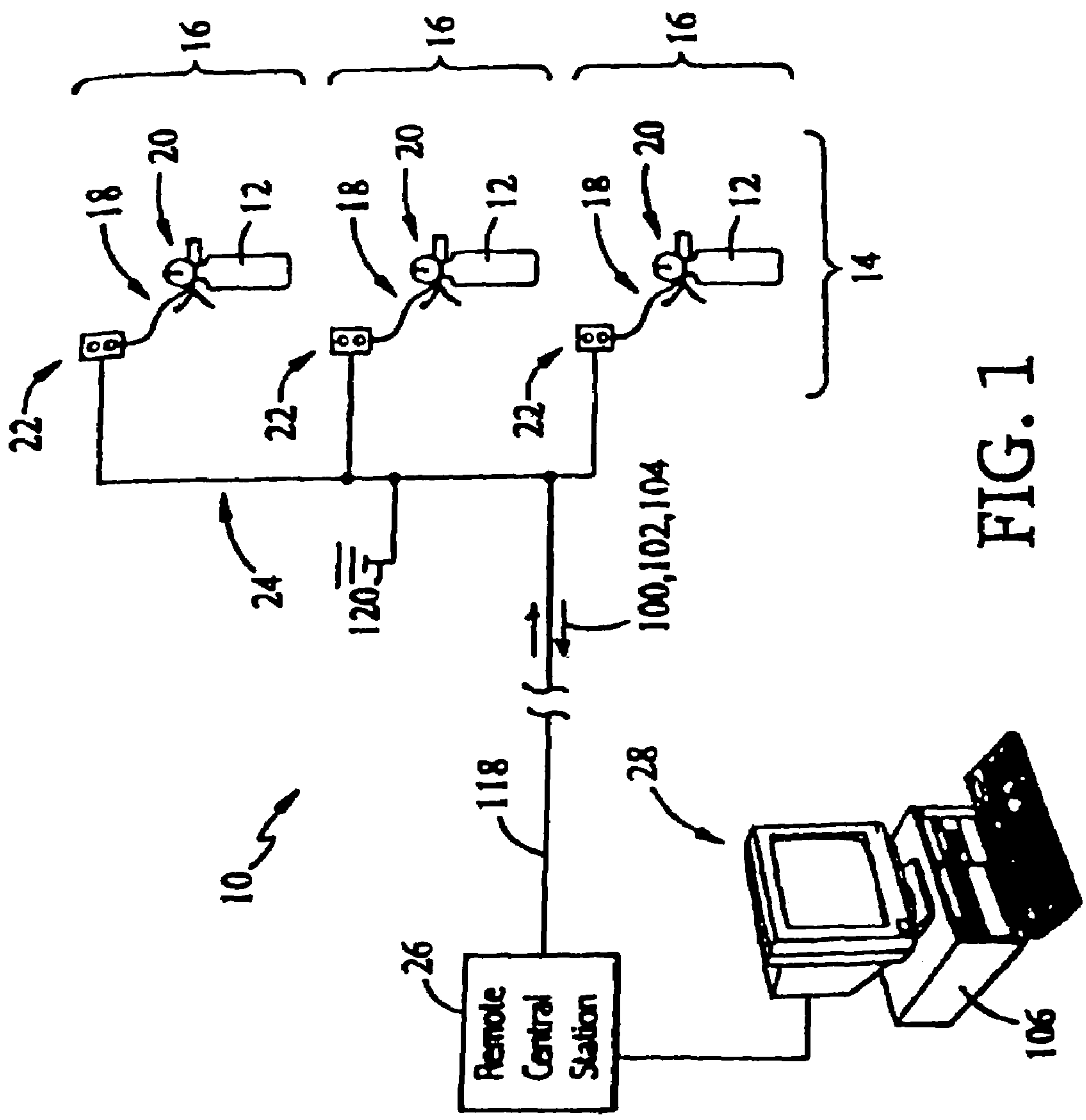
FIG. 1 is a somewhat diagrammatic view of an apparatus for remote inspection of portable pressurized tanks distributed at a system of stations, in this embodiment, fire extinguishers are distributed at a system of fire extinguisher stations.

Referring to FIG. 1, in one embodiment, an apparatus 10 for remote inspection of portable tanks inspects portable fire extinguishers 12 installed at one or a system 14 of fire extinguisher stations 16 includes means 18 for detecting lack of presence of a fire extinguisher 12 in its installed position at a fire extinguisher station 16, means 20 for detecting out-of-range pressure of the contents of a fire extinguisher 12 at a fire extinguisher station 16, means 22 for detecting an obstruction to viewing of or access to a fire extinguisher station 16, and means 24 for transmitting inspection report information for each of the fire extinguisher stations 16 to a remote central station 26. The apparatus 10 may further include means 28 for maintaining a record of inspection report information.

Figure 2:
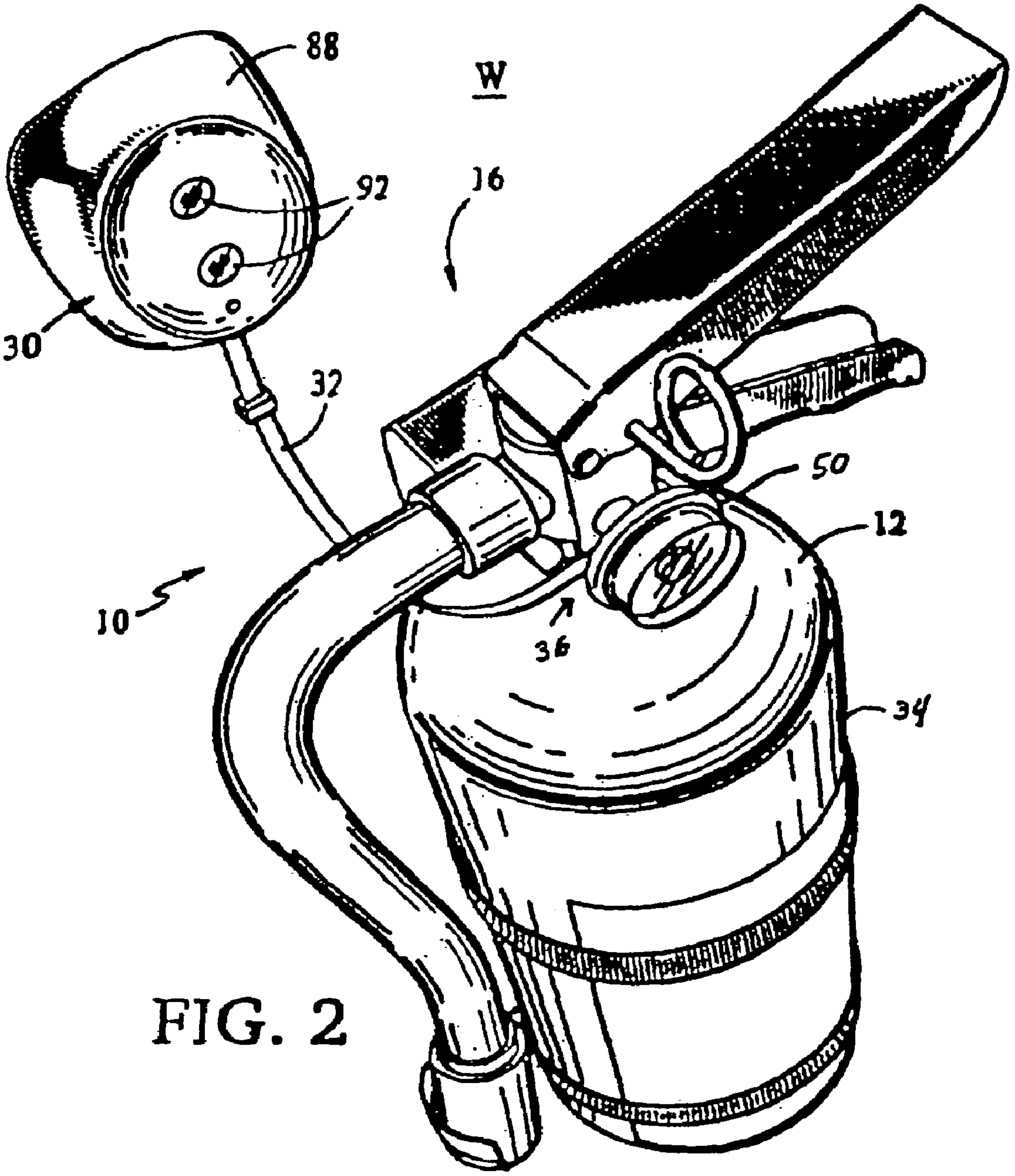
FIG. 2 is a perspective view of a fire extinguisher mounted at a fire extinguisher station for remote inspection.

As an example of a remote inspection apparatus 10, in FIG. 2, a portable fire extinguisher 12 is shown mounted to a wall, post, or other support surface, W, at a fire extinguisher station 16 in a system of fire extinguisher stations 14, as described in U.S. patent application Ser. No. 10/274,606, filed Oct. 21, 2002, now pending, which is a continuation-in-part of U.S. application Ser. No. 09/832,531, filed Apr. 11, 2001, now U.S. Pat. No. 6,585,055, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned, the complete disclosures of all of which are incorporated herein by reference. Additionally, portions of the apparatus 10 are described in U.S. patent application Ser. No. 08/638,343, filed Apr. 26, 1996, now U.S. Pat. No. 5,834,651, issued Nov. 10, 1998, which is a divisional of U.S. application Ser. No. 08/403,672, filed Mar. 14, 1995, now abandoned, the complete disclosures of all of which are incorporated herein by reference. Additionally, portions of the apparatus 10 are described in U.S. patent application Ser. No. 10/024,431, filed Dec. 18, 2001, now pending, which claims priority of U.S. Provisional Application No. 60/256,372, filed Dec. 18, 2000, now expired, the complete disclosures of all of which are incorporated herein by reference. Additionally, portions of the apparatus 10 are described in U.S. patent application Ser. No. 09/988,852, filed Nov. 19, 2001, now U.S. Pat. No. 6,488,099, issued Dec. 3, 2002, which is a divisional of the U.S. application Ser. No. 09/832,531, filed Apr. 11, 2001, now U.S. Pat. No. 6,585,055, issued Jul. 1, 2003, the complete disclosures of all of which are incorporated herein by reference. Additionally, portions of the apparatus 10 are described in International Application No. PCT/US02/11401, with an International Filing Date of Apr. 4, 2002, now pending, which claims priority of the U.S. application Ser. No. 09/832,531, filed Apr. 11, 2001, now U.S. Pat. No. 6,585,055, the complete disclosures of all of which are incorporated herein by reference. Additionally, portions of the apparatus 10 are described in U.S. patent application Ser. No. 09/742,733, filed Dec. 20, 2000, now U.S. Pat. No. 6,311,779, issued Nov. 6, 2001, the complete disclosure of which is incorporated herein by reference.

As shown in FIG. 2, the portable fire extinguisher 12 typically includes a fire extinguisher tank 34 containing a fire extinguishing material, e.g., water, dry chemical or gas, and a fire extinguisher valve assembly 36 (e.g. as available from MIJA Industries Inc., of Rockland, Mass.) mounted to releasably secure an opening in the tank. The valve assembly 36 further includes a gauge 50 (e.g., a Bourdon coiled tubing gauge of the type also available from MIJA Industries Inc.) to provide indication of the pressure status of fire extinguishing material within the fire extinguisher tank 34. A Hall effect sensor is included in the gauge 50 and is adapted to provide a signal as the extinguisher tank 34 contents approach a low pressure limit or a high pressure limit, as described in U.S. patent application Ser. No. 10/274,606, filed Oct. 21, 2002.

In this implementation, the fire extinguisher 12 at each fire extinguisher station 16 is releasably connected to a docking station 30 by an electronics and communications tether 32 that transfers signals between the fire extinguisher 12 and the docking station 30 along with initiating a signal sent by the docketing station to the remote central station 26 (shown in FIG. 1) based on movement of the extinguisher as also described in U.S. patent application Ser. No. 10/274,606, filed Oct. 21, 2002. Signals initiated from the gauge 50 and through the tether 32, to the docking station 30 and remote central station 26 (shown in FIG. 1), provide an indication of out-of-range (low or high) pressure in the tank 34.

The length of the tether 32, and the tenacity of engagement of the tether between the docking station 30 and the fire extinguisher 12 is preferably selected so that any significant movement of the fire extinguisher 12 relative to its installed position, i.e., the position in which it is placed at installation by a fire extinguisher professional, whether removal, or, in a preferred implementation, merely upon rotation with movement in excess of a predetermined threshold value, will result the tether releasing from the fire extinguisher 12, breaks communication between the gauge 50 and the docking station 30, and initiating a signal to the remote central station 26 (shown in FIG. 1).

In the implementation shown in FIG. 2, the docking station 30 is fixedly mounted to the wall, W, at a predetermined position. The docking station 30 consists of a housing 88 containing a sonar module (not shown) and defining spaced apertures or windows 92 through which the module emits and receives ultrasonic signals. Also, disposed within the docking station housing 88 is an electronic and communications circuit (not shown) that transmits and receives signals to and from the connected fire extinguisher 12 and the remote central station 26 (shown in FIG. 1), as described more fully in U.S. application Ser. No. 10/274,606, filed Oct. 21, 2002.

Referring to FIG. 1, the circuitry contained in docking station housing 88 (shown in FIG. 2) issues a signal 100 or a signal 102 upon detection of a predetermined external condition, e.g., lack of presence of the fire extinguisher 12 at its installed position at the fire extinguisher station 16, when the fire extinguisher 12 is removed from, or moved within the respective station, thereby disengaging the tether 32 (shown in FIG. 2) from its connection to the respective fire extinguisher 12, and disrupting the closed connection (signal 100), or an obstruction to viewing of or access to a fire extinguisher station 16 (signal 102). The docking station housing 88 circuitry also issues a signal 104 upon detection of a predetermined internal condition, e.g., existence of an out-of-range, e.g., low, pressure condition of the fire extinguishing material contained within the fire extinguisher tank 34 (shown in FIG. 2).

According to one implementation, the signals 100, 104 are communicated between the fire extinguisher 12 and the electronics and communications circuitry within docking station 30 though the connected tether 32. The signal 100 indicating lack of presence of the fire extinguisher 12 in its installed position at the fire extinguisher station 16 and signal 104 indicating that pressure of the fire extinguishing material in the fire extinguisher tank 34 is below the predetermined minimum pressure level, e.g., indicative of a discharge, leak or other malfunction (or, in an implementation with a pair of Hall Effect sensors above a predetermined maximum pressure level) are received by circuitry within the docking station 30 and transmitted via hardwire connection 118 to the remote central station 26. However, it is contemplated that, in other implementations, signals 100, 102, 104 may be communicated, e.g., via RF (or other) wireless communication circuitry via antennae 120 (FIG. 1) to an RF monitoring system receiver, e.g., at the remote central station 26, or simultaneously, via both hardwire and wireless, to a remote central station 26, or other monitoring station. Also, in some implementations wireless communication circuitry and antenna 120 (FIG. 1) are located within the housing 88 to communicate by wireless signal between the fire extinguisher 12 and the previously mentioned RF monitoring system receiver, e.g., at the remote central station 26. Signals 100, 102 are communicated by wireless signal between the remote central station 26 (FIG. 1) and the fire extinguisher station 16 upon detecting the previously mentioned predetermined external conditions. Signals, such as signal 104, are also communicated by wireless signal upon detection of the previously mentioned predetermined internal conditions. In this manner, a system of fire extinguishers, distributed over a considerable area, are maintained in wireless communication with the remote central station 26.

Figure 3:
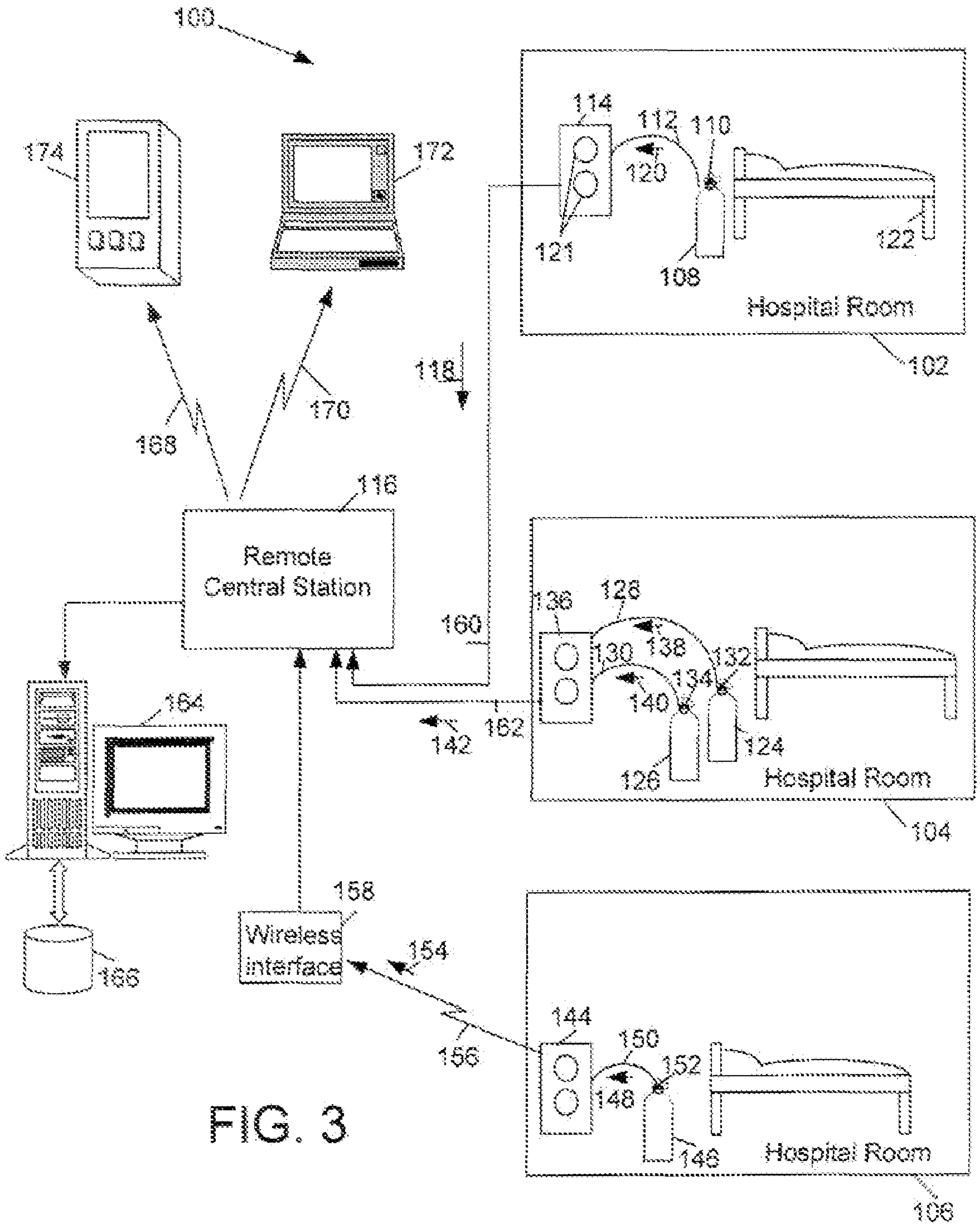
FIG. 3 is a somewhat diagrammatic view of an apparatus of the invention for remote inspection of oxygen tanks at a healthcare facility.

Referring to FIG. 3, in another implementation, an apparatus 100 for remote inspection of portable tanks includes means for monitoring the contents of oxygen tanks distributed throughout locations (e.g., rooms) associated with a healthcare facility such as a hospital, assisted living facility, or a nursing home. However, in other implementations, the apparatus 100 includes means for monitoring the contents of oxygen tanks, or other similar portable tanks, distributed throughout one or more residential homes for assisting in healthcare. Typically, one or more oxygen tanks is located throughout a facility for treatment of the current occupants of the healthcare facility. In the example shown in FIG. 3, oxygen tanks are located in three hospital rooms 102, 104, 106. In hospital room 102, an oxygen tank 108 includes a gauge 110 for monitoring the contents of the oxygen tank, such as by measuring and displaying the pressure of contained oxygen. Similar to the gauge 50 used with the fire extinguisher 12 shown in FIG. 2, the gauge 110 is in communication with an electronic tether 112 connected to a docking station 114 that includes circuitry for transmitting a signal 118 to a remote central station 116 based on a signal 120 received from the electronic tether. The signal 118 received at the remote central station 116 communicates to hospital personnel information on the internal conditions of the oxygen rank 108 as measured by the gauge 110. For example, an alert is issued if the internal pressure the oxygen tank 108 falls below a predetermined threshold so that replacement of the tank or replenishment of the oxygen can be scheduled. Also similar to the apparatus 10 shown in FIG. 1, the signal 118 may also include information representing one or more external conditions (e.g., removal of the oxygen tank, obstructed access to the oxygen tank, etc.) associated with the oxygen tank 108. For example, a sonar module, enclosed in the docking station 114, similar to the sonar module described in conjunction with FIG. 2, transmits and receives ultrasonic signals through apertures 121 to detect objects obstructing access to the oxygen tank 108, such as a bed 122.

In some embodiments, multiple oxygen tanks, or a combination of two or more tanks containing different fluids may be present in a hospital room, as shown in hospital room 104. In this arrangement, oxygen tanks 124, 126 are attached to respective gauges. 132, 134 connected by respective electronic tethers 128, 130 to communicate signals from the respective gauges. Circuitry included in a docking station 136 connects to each electronic tether 128, 130 and combines (e.g., multiplexes) signals 138, 140, received from the respective oxygen tanks 124, 126, which may include information associated with the internal conditions of each tank. Additionally, the circuitry in the docking station 136 combines information associated with external conditions (e.g., obstruction detected by a sonar module included in docking station 136) of the tanks 126, 124 with the information from the respective gauges 132, 134. Once the information is combined, a signal 142 is transmitted from the docking station 136 to the remote central station 116. In some embodiments the circuitry included in the docking station 136, or included in each gauge 132, 134, may also encode tank identification information in the signal 142, thereby permitting the remote central station 116 to differentiate between the two tanks as to the source of the transmitted signal 142.

In other embodiments, wireless signal transmission and reception circuitry (e.g., an RF circuit, antenna, etc.) may be incorporated into a docking station 144 for transmission of wireless signals between a hospital room and the remote central station 116. As shown in hospital room 106, a wireless signal 154 containing information associated with internal and external conditions of an oxygen tank 146 is transmitted from the hospital room over a wireless link 156. In hospital room 106, a docking station 144 receives a signal 148 from an electronic tether 150 connected to a gauge 152 attached to the oxygen tank 146. Wireless signal transmission circuitry in the docking station 144 transmits the signal 154 over the wireless link 156 to a wireless interface 158 that receives the wireless signal and communicates the information contained in the signal to the remote central station 116. As with hospital rooms 102 and 104, information received by the remote central station 116 includes information associated with internal conditions (e.g., internal pressure) and external conditions (e.g., obstruction) of the oxygen tank 146 to alert hospital personnel to internal and/or external conditions of the oxygen tank along with information collected from the other oxygen tanks 108, 124, 126 in each of the other hospital rooms 102, 104.

Each docking station 114, 136, 144 is connected by a hardwire connection 160, 162 or a wireless link 156 so that information associated with each oxygen tank is received by the remote central station 116. In some embodiments the hardwire connections 160, 162 are included in a communication network (e.g., a local area network, LAN, or a wide area network, WAN, etc.) to transmit the respective signals 118, 142 to the remote central station 116. With reference to hospital room 106, in some embodiments, the wireless interface 158 may receive the signal 154 over wireless link 156 and use additional wireless links (e.g., cellular links, satellite links, etc.) to transfer the internal and external conditions of the oxygen tank 146 to the remote central station 116. Also, in some embodiments, a combination of wireless links and hardwire connections can be used to transmit the signals from oxygen tanks 108, 124, 126, 146 to the remote central station 116.

After the signals are received at the remote central station 116 from the hospital rooms 102, 104, 106, the information included in the received signals is sorted and displayed by a computer system 164 to alert hospital personnel as to the internal and external conditions associated with each oxygen tank 108, 124, 126, 146. The computer system 164 also stores the received and sorted information on a storage device 166 (e.g., a hard drive, CD-ROM, etc.) for retrieval at a future time for further processing and reporting. In some embodiments the remote central station 116 may include wireless transmission and reception circuitry for transmitting and receiving wireless signals. For example, wireless circuitry (e.g., RF circuitry, antenna, etc.) included in the remote central station 116 can be used to transmit information over wireless links 168, 170 to wireless devices such as a laptop computer 172, a personal digital assistant (PDA) 174, or other similar wireless device (e.g., a cellular phone). Transmission of the information to wireless devices provides hospital personnel not located at the remote central station 116 with information on the condition of the oxygen tanks 108, 124, 126, 146 and an alert to any problems (e.g., tank pressure in hospital room 102 as fallen below a predetermined threshold) associated with one or more of the oxygen tanks. By providing wireless access to the information collected at the remote central station 116, the response time of hospital personnel to one or more of hospital rooms can be reduced.

Figure 4:
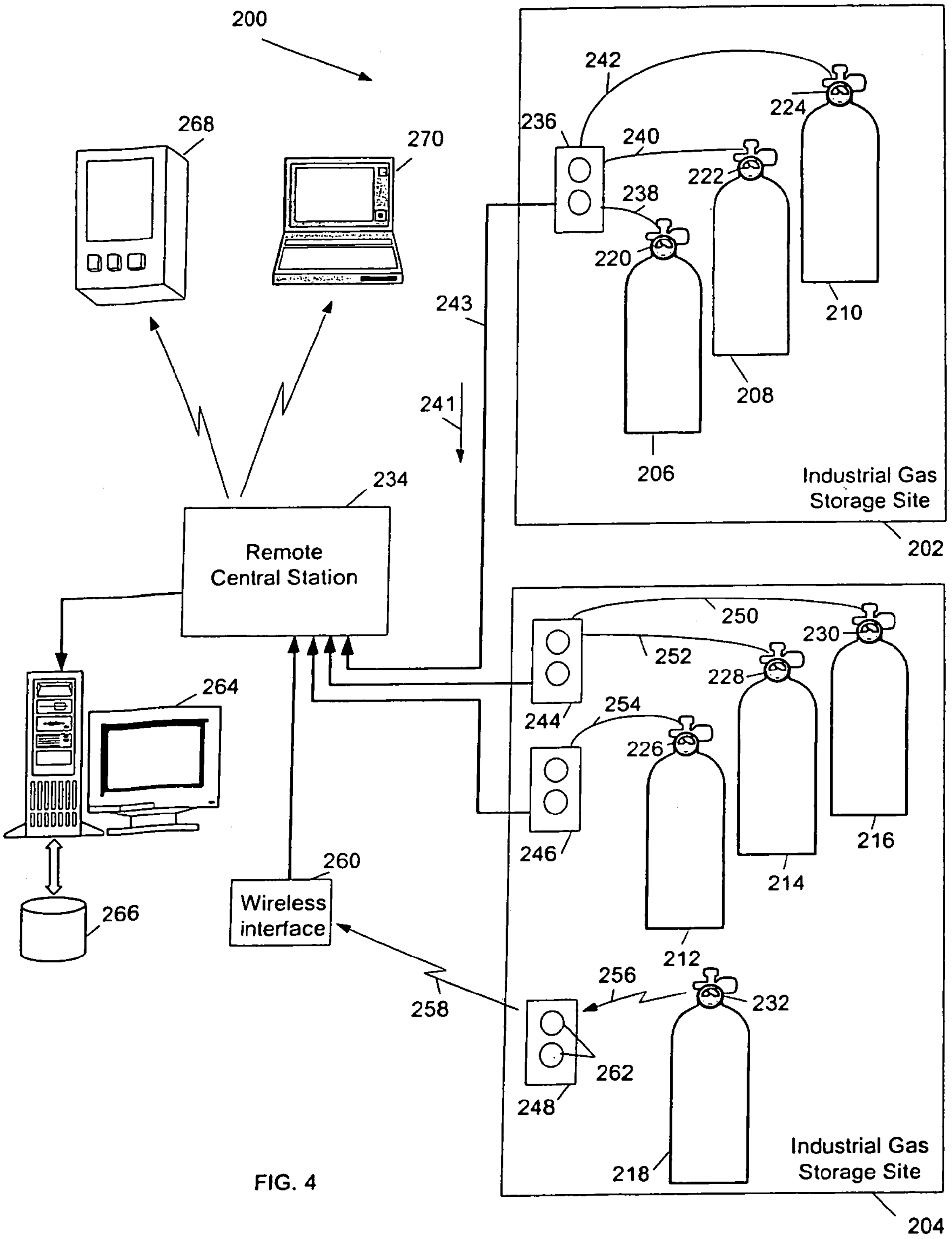
FIG. 4 is a somewhat diagrammatic view of an apparatus for remote inspection of industrial tanks at an industrial tank storage facility.

Referring to FIG. 4, in another embodiment, an apparatus 200 for remote inspection of portable tanks includes means for monitoring contents of industrial gas tanks 206, 208, 210, 212, 214, 216, 218 stored at industrial gas storage sites 202, 204. Contents of each industrial tank 206, 208, 210, 212, 214, 216, 218 are monitored with respective gauges 220, 222, 224, 226, 228, 230, 232 such that each is capable of initiating a signal to a remote central station 234 to alert storage site personnel to internal conditions (e.g., internal pressure) associated with each industrial tank. In industrial gas storage site 202, three respective gas tanks 206), 208, 210 are stored in communication with a docking station 236 by respective electronic tethers 238, 240, 242 respectively connected to gauges 220, 222, 224 for monitoring the industrial gases in each respective tank. In this particular arrangement, docking station 236 is connected to all three electronic tethers 238, 240, 242, and includes circuitry for combining (e.g., multiplexing) signals from each of the three industrial gas tanks 206, 208, 210 into a single signal 241 that is transmitted over a hardwire 243 to a remote central station 234. Similar to the docking station 114 shown in FIG. 3, external conditions associated with the industrial gas tanks 206, 208, 210 are monitored from the docking station and a signal is initiated by a sonar module included in the docking station 236 when an obstruction is detected. Similar to the docking station 30 shown in FIG. 2, a signal is also initiated from circuitry included in the docking station 236 when the electrical connection between the docking station and any of the electronic tethers 238, 240, 242 is broken.

Industrial gas storage site 204 includes three docking stations 244, 246, 248 that respectively receive signals from the respective gauges 226, 228, 230, 232 monitoring the contents of the respective industrial gas tanks 212, 214, 216, 218. In this particular example, a docking station 244 connects to two gas tanks 214, 216 via respective electronic tethers 250, 252 while another docking station 246 is dedicated to receiving signals from gas tank 212 through electronic tether 254. Similarly, a third docking station 248 at storage site 204 is dedicated to industrial gas tank 218. However, gauge 232 monitoring the contents of industrial gas tank 218 and the associated docking station 248 monitoring the gas tank external conditions each includes wireless transmission and reception circuitry to provide a wireless communication link 256 for transmitting internal conditions of the tank 218 from the gauge 232 to the docking station 248. Similar to the tether 32 (shown in FIG. 2) releasing from the docking station 30 (also shown in FIG. 2), the wireless link 256 also initiates a signal from the docking station 248 if the link is interrupted due to moving of the gas tank 218 from close proximity to the docking station. The wireless transmission and reception circuitry in the docking station 248 also forms a wireless link 258 with a wireless interface 260, so that information encoded in a wireless signal received by the docking station 248 from the gauge 232 is transmitted to the wireless interface, which transfers the information to the remote central station 234. The docking station 248 also uses the wireless link 258 for transmitting information associated with external conditions (e.g., obstruction) of the tank 218, as provided by apertures 262 and a sonar module included in the docking station similar to the previous docking stations described in conjunction with FIG. 1-3.

Similar to the apparatus 100 shown in FIG. 3, the remote central station 234 receives information from each docking station 236, 244, 246, 248 and transfers the information to a computer system 264 for processing (e.g., sorting) and displaying. In this example, storage site personnel are provided with information on internal conditions (e.g., internal tank pressure) and external conditions (e.g., tank obstruction) associated with each tank 206, 208, 210, 216, 214, 216, 218 and alerted to any potential emergencies. The computer system 264 also stores information on a storage device 266 for retrieval at a future time e.g., for further analysis. Also similar to the apparatus 100 (shown in FIG. 3), the remote central station 234 includes wireless transmission and reception circuitry (e.g., RF circuits, antenna, etc.) for wireless transmission and reception of information to a personal digital assistant 268, a laptop computer 270, or other wireless devices (e.g., a cellular phone) so that storage site personnel (or other interested parties) not located at the remote central station 234 can be informed of the internal and external conditions of each tank 206, 208, 210, 216, 214, 216, 218 stored at each respective storage site 202, 204. By transmitting conditions related to each tank to storage site personnel, response times for out-of-standard conditions present at one or both sites 202, 204 (e.g., internal pressure rising to dangerous level in the tank 206, an unscheduled re-locating of the tank 212, etc) may be reduced.

Figure 5:
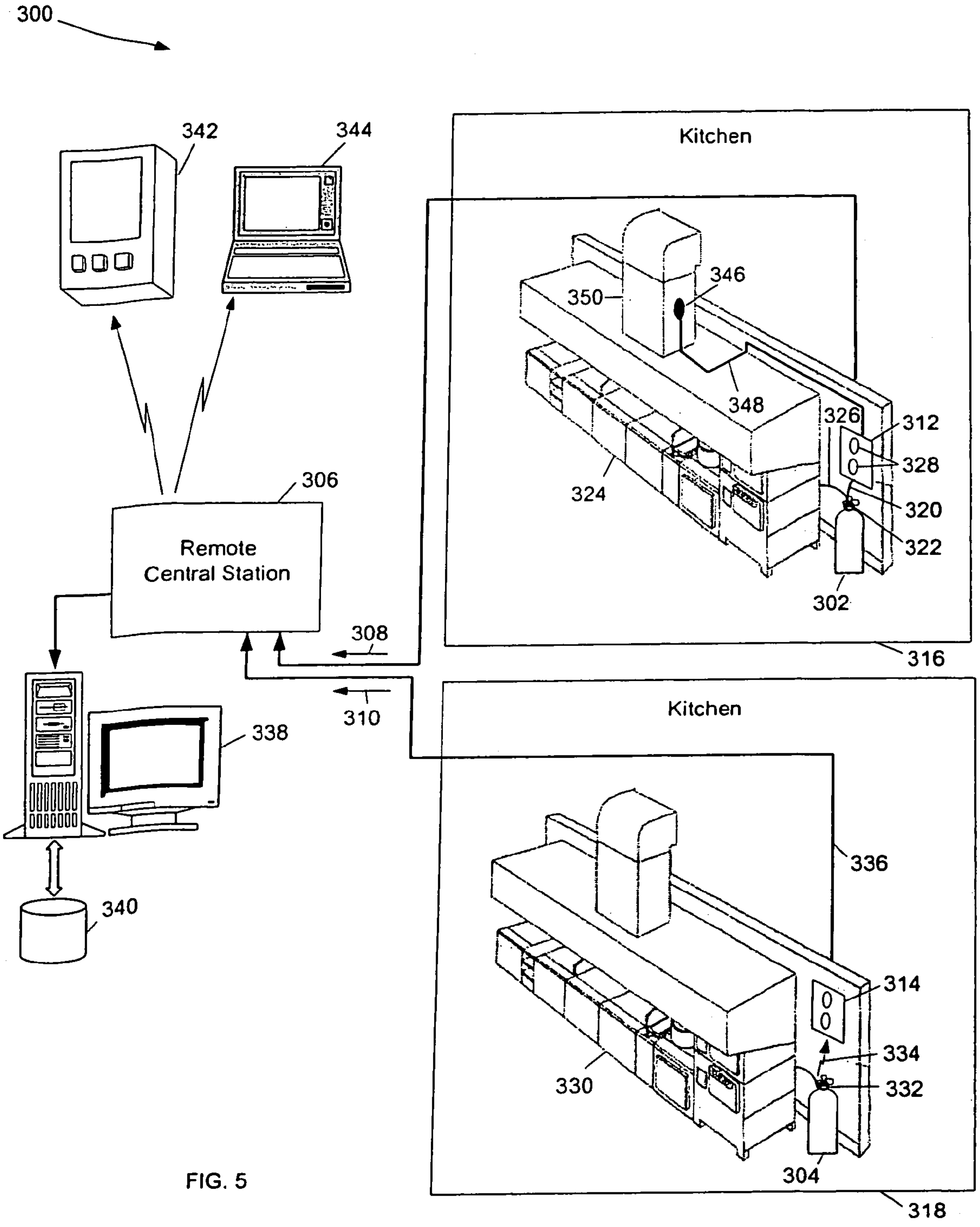
FIG. 5 is a somewhat diagrammatic view of an apparatus for remote inspection of commercial gas tanks at a commercial facility.

Referring to FIG. 5, in another implementation, an apparatus 300 for remote inspection of portable tanks includes means for monitoring contents of gas tanks 302, 304 used in commercial facilities. In this particular embodiment a remote central station 306 receives signals 308, 310 from two respective wall-mounted docking stations 312, 314 located in two respective commercial kitchens 316, 318. In kitchen 316 the wall-mounted docking station 312 receives signals through an electronic tether 320 from a gauge 322 monitoring the internal conditions of the tank 302 supplying gas to kitchen equipment 324 through a connected gas hose 326. Similar to the docking stations shown in FIG. 2-4, a sonar module in the docking station 312 detects access obstructions to the tank 302 through apertures 328. By monitoring the internal and external conditions associated with tank 302, personnel located at the remote central station 306 can detect when the contents of the tank are nearly exhausted and schedule tank replacement or contents replenishment.

Similar monitoring is performed in kitchen 318 for tank 304 providing gas to kitchen equipment 330. However, in this particular embodiment, a gauge 332 and a docking station 314 each includes wireless transmission and reception circuitry (e.g., RF circuit, antenna, etc) such that the gauge transmits one or more signals encoded with information relating to the internal conditions of tank 304 over a wireless link 334 to the docking station. Upon receiving the one or more signals from the gauge 332, the docking station 314 transmits the signal 310 over a hardwire 336 to the remote central station 306. However, in some embodiments the wireless transmission and reception circuitry included in the docking station 314 and the remote central station 306 allows the signal 310 to be transmitted over a wireless link.

Similar to the apparatus shown in FIG. 3, the remote central station 306 includes a computer system 338 that collects and stores, on a storage device 340, information transmitted to the remote central station and processes (e.g., sorts) the received information such that the remote central station can alert personnel to internal conditions (e.g., internal pressure) and external conditions (e.g., access obstructed) associated with each tank 302, 304. Once alerted, the personnel can take appropriate steps based on the internal (e.g., reduce internal pressure in the tank 302) and/or external (e.g., remove obstructions near the tank 304) conditions detected. Similar to the apparatus 100 shown in FIG. 3, the remote central station 306 includes wireless transmission and reception circuitry (e.g., RF circuits, antenna, etc) for transmitting wireless signals to a PDA 342 and a laptop computer 344, or other wireless devices (e.g., a cellular phone) so that personnel can quickly be alerted to the internal pressure of the tanks 302, 304, obstructions of the tanks, or other internal and external conditions by using these wireless devices.

In some embodiments a flow gauge 346 monitors exhaust gases that propagate through a hood 350 of the kitchen equipment 324 of kitchen 316. A hardwire cable 348 carries one or more signals from the flow gauge 346 to the docking station 312 that sends one or more signals to the remote central station 306 for processing (e.g., sorting) and display of information associated with the exhaust gases (e.g., exhaust flow rate, exhaust volume, etc). However, in some embodiments hardwire cable 348 may be replaced by a wireless link by including wireless transmission and reception circuitry (e.g., RF circuit, antenna, etc.) with the flow gauge 346 such that one or more wireless signals are sent to wireless transmission and reception circuitry in the docking station 312. Similar to the information processed from the tanks 302, 304, information from the flow gauge 346 can be sent from the docking station 312 to the remote central station 306 and then transmitted to wireless devices (e.g., PDA 342, laptop computer 344, etc.) so that personnel can be quickly alerted to abnormal gas exhaust conditions.

In the particular embodiment shown in FIG. 5, the gauges 322, 332 and the docking stations 312, 314 monitor internal and external conditions of the respective tanks 302, 304 and the flow gauge 346 monitors exhaust gases that flow through the hood 350. However, in some embodiments one or more gauges, docking stations, and/or flow gauges can be used individually or in combination to monitor internal and external conditions of a chemical hood and portable chemical tanks that are used in conjunction with the chemical hood. Chemical hoods are often implemented for venting harmful gases used in fabrication processes, manufacturing processes, and other processes that use one or more chemicals stored in portable tanks. By monitoring internal conditions (e.g., internal pressure) of the portable chemical tanks used with the chemical hoods, information collected can be used to alert personnel when internal pressure of a particular chemical tank is low and the tank should be scheduled for replacement. Also, a sonar module in a docking station associated with monitoring of a portable chemical tank can detect if an object is obstructing access to the tank and to quickly alert personnel to this potentially dangerous situation. A flow gauge mounted onto the chemical hood, similar to flow gauge 346 mounted to the hood 350 (shown in FIG. 5), additionally allows monitoring of e.g., the flow rate, volume, and other properties of the exhaust gases. Information collected by the flow gauge and transmitted to a remote central station, can also be stored for future analysis such as for evaluating flow changes over time that may have been caused e.g., by an obstruction in the chemical hood or some other flow reduction source like a malfunctioning exhaust fan.

In this embodiment, a non-contact ultrasonic sensor (sonar module) is employed for detecting the presence of an obstruction. Alternatively, a non-contact optical sensor may be employed. Both have sensitivity over wide ranges of distances (e.g., about 6 inches to about 10 feet, or other ranges as may be dictated, e.g., by environmental conditions). As an obstruction may move slowly, or may be relatively stationary, it may not be necessary to have the sensor active at all times; periodic sampling, e.g., once per hour, may be sufficient. On the other hand, the sonar module in the docking station 312 may also be utilized as a proximity or motion sensor, e.g., in a security system, e.g., to issue a signal to the remote central station 306 and/or to sound an alarm when movement is detected in the vicinity of the portable tank 302 while kitchen 316 is not operating, e.g., after business hours or during weekends or vacations in this case, continuous operation may be dictated, at least during periods when the security system is active. Other features and characteristics may be optimally employed, as desired, including: wide angle and narrow angle sensitivity, digital output ("Is there an obstruction or not?"), and/or analog output (e.g., "How large an obstruction?" and "How far away from the docking station?").

Gauge 322 may optionally include an electro luminescent light panel that generates a visual signal to passersby, warning of the low-pressure condition of the portable tank 302. In some embodiments, the gauge 322 may include an electronic circuit that causes intermittent illumination of the light panel, thereby to better attract the attention of passersby.

Additionally, the gauge 322 may include an electronic circuit and an audio signaling device for emitting, e.g., a beeping sound, instead of or in addition to the visual signal. The audio signal device may be triggered when internal pressure of the portable tank 302 drops to or below a predetermined level. The audio signal may consist of a recorded information message, e.g., instructions to replace the tank or to replenish the tank contents. The gauge 322 may also include a light sensor, e.g., of ambient light conditions, to actuate illumination of the light panel in low or no light conditions, e.g., to signal the location of the portable tank 302, at night or upon loss of power to external lighting. The gauge 322 may also include a sensor adapted to sense other local conditions, e.g., smoke or fire, to actuate illumination of the light panel and/or audio signal device when smoke or other indications of a fire are sensed, e.g., to signal the location of the tank, when visibility is low.

The gauge 322 may also include electronic circuitry to encode an identification specific to the associated tank 302 for receiving and dispatching signals or messages, e.g., of the internal condition of the tank, via the electronics and communications circuitry included in the docking station 312, and/or an internal antenna, identifiable as relating to that tank, to the remote central station 306 and/or to other locations. The docking station 312 may contain a circuit board programmed with the protocols for certain alarms or signals relating to predetermined internal and external conditions, and may include a battery for primary or auxiliary power.

In other embodiments, two or more sonar modules may be employed to provide additional beam coverage. Also, various technologies may be implemented to communicate by wireless signal among the gauge 320 and/or the docking station 312 and/or the remote central station 306. Radio frequency (RF) signaling, infrared (IR) signaling, optical signaling, or other similar technologies may be employed to provide communication links. RF signaling, IR signaling, optical signaling, or other similar signaling technologies may also be implemented individually or in any suitable combination for communicating by wireless signal among the gauge 322, the docking station 312, and the remote central station 306.

In other embodiments, wireless signaling technology may incorporate telecommunication schemes (e.g., Bluetooth) to provide point-to-point or multi-point communication connections among the tanks 302, 304 and/or the docking stations 312, 314 and/or the remote central station 306. These telecommunication schemes may be achieved, for example, with local wireless technology, cellular technology, and/or satellite technology. The wireless signaling technology may further incorporate spread spectrum techniques (e.g., frequency hopping) to allow the extinguishers to communicate in areas containing electromagnetic interference. The wireless signaling may also incorporate identification encoding along with encryption/decryption techniques and verification techniques to provide secure data transfers among the devices.

In other embodiments, a Global Positioning System (GPS) may be located on the tank 302 and/or the gauge 322 and/or the docking station 312 and/or the remote central station 306. The GPS may determine, for example, the geographic location of each respective tank and provide location coordinates, via the wireless signaling technology, to the other tanks and/or the remote central stations. Thus, the GPS system may provide the location of the tanks and allow, for example, movement tracking of the tanks.

In still other embodiments, various sensing techniques, besides the sonar modules, may sense objects obstructing access to the tank 302. Similar to sonar, obstructing objects may be detected by passive or active acoustic sensors. In other examples, obstructions may be sensed with electromagnetic sensing techniques (e.g., radar, magnetic field sensors), infrared (IR) sensing techniques (e.g., heat sensors, IR sensors), visual sensing techniques (e.g., photo-electric sensors), and/or laser sensing techniques (e.g., LIDAR sensors). These technologies may, for example, be utilized individually or in concert to sense obstructions that block access to the tank 302.

Also, the signaling may use networking techniques to provide one-directional and/or multi-directional communications among the devices. In one example, signals may be networked asynchronously, such as in an asynchronous transfer mode (ATM). The signals may also be networked synchronously, such as, for example, in a synchronous optical network (SONET). In still another example, the signals may be transmitted over a landline in an integrated services digital network (ISDN), as well as over other similar media, for example, in a broadband ISDN (BISDN).

A remote inspection apparatus may also be employed for remote inspection of multiple portable tanks at one or a system of locations. Communication, including wireless communication, or inspection or other information, between the portable tank and the central station, may be carried on directly, or indirectly, e.g. via signal or relay devices, including at the docking station in communication with the gauge attached to the portable tank.

Figure 6:
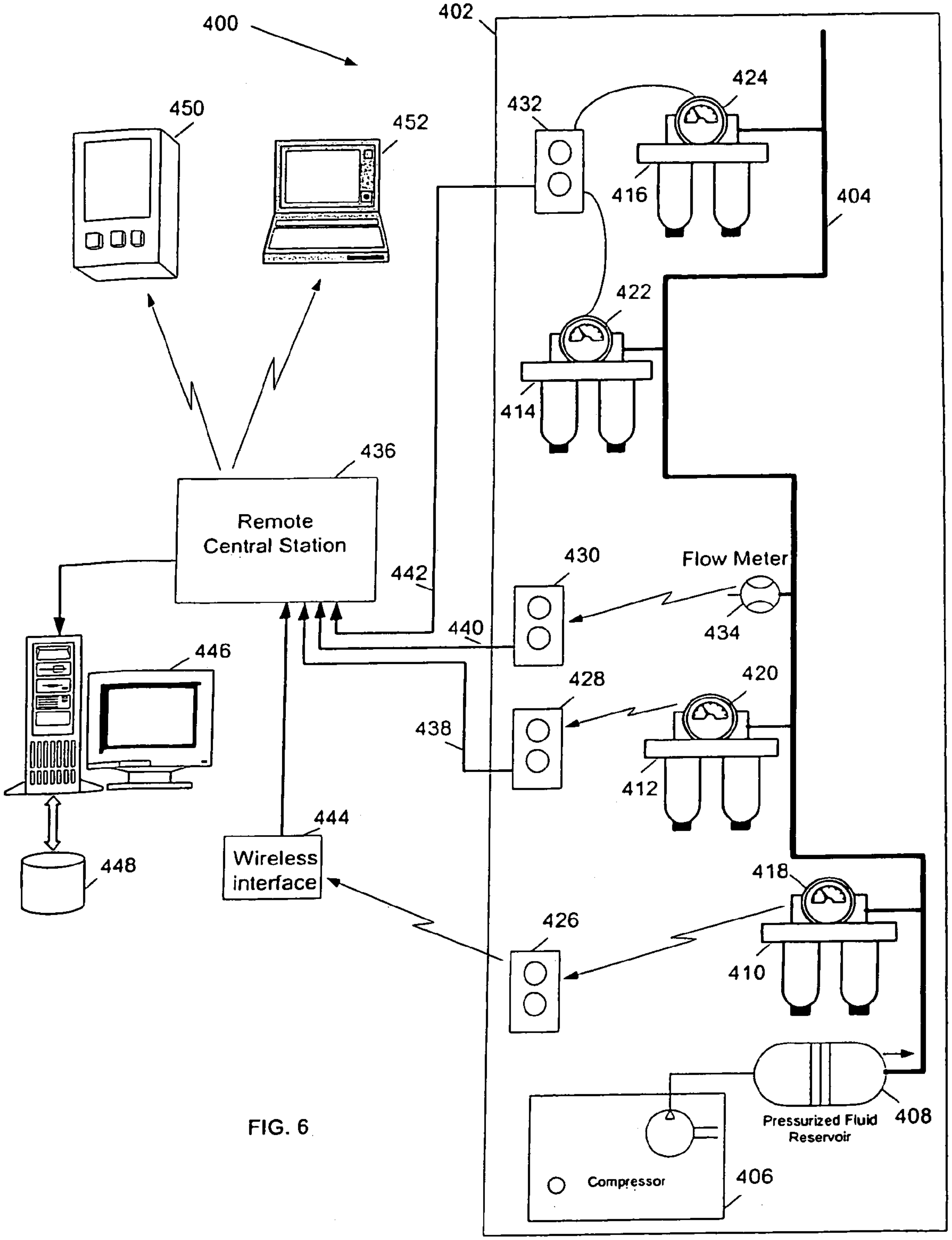
FIG. 6 is a somewhat diagrammatic view of an apparatus for remote inspection of a pipeline in a manufacturing facility.

Referring to FIG. 6, in another implementation, an apparatus 400 provides for remote inspection of fluid flow in a manufacturing plant 402 or other similar facility. In this particular embodiment a fluid such as hydraulic fluid, air, water, oxygen, fuel oil, etc. flows through a pipeline 404 that extends throughout the manufacturing plant 402 for use in manufacturing or other commercial or private enterprises. However, in other embodiments, for example in conjunction with FIG. 3, the pipeline 404 may be extended into one or more of the hospital rooms 102, 104, 106 to provide an oxygen source and replace the need for the respective oxygen tanks 110, 124, 126, 146. Returning to FIG. 6, a compressor 406 is connected to a fluid reservoir 408 for pressuring contained fluid and the pipeline 404 serves as a means to deliver the pressurized fluid to one or more sites within the manufacturing plant 402. As the pipeline 404 extends throughout the manufacturing plant 402 a number of filter units 410, 412, 414, 416 are connected to the pipeline for filtering the pressurized fluid and monitoring the pressure of the fluid carried by the pipeline. Each of the filter units 410, 412, 414, 416 includes a pair of filters and a respective gauge 418, 420, 422, 424 that is similar to the gauges 110, 132, 134, 152 shown in FIG. 3. Also similar to FIG. 3, each of the gauges 418, 420, 422, 424 is in communication with a respective wall-mounted docking station 426, 428, 430, 432 by either an electronic tether or a wireless link. Each of the wall-mounted docking stations 426, 428, 430, 432 receives signals initiated from the respective gauge 418,

420, 422, 424 that contains information such as the pipeline pressure detected by the gauge.

Also, in this particular embodiment a flow meter 434 is connected to the pipeline 404 to measure the flow of fluid through a particular portion of the pipeline. Similar to the gauges 418, 420 included in the filter units 410, 412, the flow meter 434 includes wireless signal transmission and reception circuitry (e.g., an RF circuit, antenna, etc.) to form a wireless link with the docking station 430. Also in some embodiments, similar to the docking stations 114, 136, 144 shown FIG. 3, circuitry included in the docking stations combines the information provided by the respective gauge with external conditions (e.g., an obstruction detected by a sonar module included in the docking stations) monitored at the docking stations. Once combined, signals are transmitted from the docking stations 426, 428, 430, 432 to a remote central station 436. In some embodiments, each docking station 426, 428, 430, 432, gauge 418, 420, 422, 424, or flow meter 434 individually or in combination includes circuitry that encodes identification information in the respective signal to permit the remote central station 436 to differentiate among the filter units 418, 420, 422, 424 or the flow meter 434 as the source of the transmitted signal. Similar to the docking station 136 shown in FIG. 3, the docking station 432 includes circuitry and connections for permitting two of the gauges 422, 424 to each connect to the docking station and for combining (e.g., multiplexing) signals initiated from each of the two gauges prior to transmitting a signal to the remote central station 436. Respective hardwires 438, 440, 442 are used for transmitting respective signals initiated at the docking stations 428, 430, 432 to the central remote station 436. However, the docking station 426 includes wireless signal transmission and reception circuitry (e.g., an RF circuit, antenna, etc.) for initiating wireless signal transmission to a wireless interface 444 connected to the remote central station 436.

Similar to the apparatus 100 shown in FIG. 3, the remote central station 436 includes a computer system 446 that collects and stores, on a storage device 448, information transmitted to the remote central station and processes (e.g., sorts) the received information such that the remote central station can alert personnel to internal conditions (e.g., pressure, flow rate, etc) of the pipeline 404 and external conditions (e.g., access obstructed) associated with one or more of the filter units 410, 412, 414, 416 and the flow meter 434. Once alerted, the personnel can take appropriate steps based on the internal (e.g., inspect the pipeline 404 for a pressure drop) and/or external (e.g., remove obstructions near an obstructed filter unit) conditions detected. Also, similar to the apparatus 100 shown in FIG. 3, the remote central station 436 includes wireless transmission and reception circuitry (e.g., RF circuits, antenna, etc.) for initiating wireless signal transmissions to a PDA 450 and/or a laptop computer 452, or other wireless devices (e.g., a cellular phone) so that personnel can quickly be alerted to the pressure and flow rate along the pipeline 404, obstructions of the filter units 410, 412, 414, 416 or flow meter 434, or other internal and external conditions by using these wireless devices.

Accordingly, other embodiments are within the scope of the following claims.

What is claimed is:

1. Apparatus for remote inspection of a pressurized medical fluid container comprising:

a detector in communication with the pressurized fluid for measure of a predetermined internal condition of the container;

an electronic circuit in communication between the detector and a remote central station for issue of a wireless signal to the remote central station, the wireless signal including information about the predetermined internal condition; and a docking station, wherein the detector is electrically connected to the docking station and the electronic circuit is at least partially contained within the docking station.

2. The apparatus of claim 1 wherein the electronic circuit is adapted to issue a wireless signal upon detection of the predetermined internal condition.

3. The apparatus of claim 1 wherein the predetermined internal condition comprises an out of range pressure condition of the fluid.

4. The apparatus of claim 1 wherein the electronic circuit is configured to issue a signal upon detection that the pressure of the fluid is at or below a predetermined level.

5. The apparatus of claim 3 wherein the detector comprises a fluid pressure gauge in communication with the container fluid for measure and display of a pressure condition of the fluid.

6. The apparatus of claim 1 further comprising:

a second detector for detection of a predetermined external condition.

7. The apparatus of claim 6 wherein the second detector comprises an electronic tether in electrical communication with the electronic circuit.

8. The apparatus of claim 7 wherein the medical fluid container is located in an installed position and the predetermined external condition comprises the lack of presence of the medical fluid container in its installed position.

9. The apparatus of claim 8 wherein the electronic circuit is adapted to issue a signal upon detection of the lack of presence of the medical fluid container in its installed position.

10. The apparatus of claim 6 wherein the second detector comprises a sonic sensor for detecting presence of an obstruction to or viewing of the medical fluid container.

11. The apparatus of claim 6 further comprising:

a third detector for detection of a second predetermined external condition.

12. The apparatus of claim 11 wherein the second detector comprises an electronic tether for detecting the lack of presence of the medical fluid container in an installed position and the third detector comprises a sonic sensor for detecting presence of an obstruction to or viewing of the medical fluid container.

* * * * *